US008266238B2

(12) United States Patent
Zimmer et al.

(10) Patent No.: US 8,266,238 B2
(45) Date of Patent: Sep. 11, 2012

(54) MEMORY MAPPED NETWORK ACCESS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1111 days.

(21) Appl. No.: 11/646,083

(22) Filed: Dec. 27, 2006

(65) Prior Publication Data

US 2008/0162680 A1    Jul. 3, 2008

(51) Int. Cl.
G06F 15/167    (2006.01)
(52) U.S. Cl. ............. 709/213; 709/223; 711/6; 711/202
(58) Field of Classification Search .................. 709/213; 711/202, 203, 206
See application file for complete search history.

(56) References Cited

U.S. PATENT DOCUMENTS

| | | | | |
|---|---|---|---|---|
| 6,049,889 | A * | 4/2000 | Steely et al. | 714/4 |
| 6,107,025 | A * | 8/2000 | Caskey et al. | 435/6 |
| 7,111,145 | B1 * | 9/2006 | Chen et al. | 711/206 |
| 7,254,712 | B2 * | 8/2007 | Godfrey et al. | 713/176 |
| 7,376,949 | B2 * | 5/2008 | Lowell et al. | 718/1 |
| 2002/0129274 | A1 * | 9/2002 | Baskey et al. | 713/201 |
| 2003/0061462 | A1 * | 3/2003 | Fister et al. | 711/206 |
| 2004/0117375 | A1 * | 6/2004 | Saha et al. | 707/10 |
| 2006/0004944 | A1 * | 1/2006 | Vij et al. | 711/6 |
| 2006/0075057 | A1 * | 4/2006 | Gildea et al. | 709/212 |
| 2006/0129743 | A1 * | 6/2006 | Herrell et al. | 711/100 |
| 2006/0288189 | A1 * | 12/2006 | Seth et al. | 711/207 |
| 2007/0005919 | A1 * | 1/2007 | van Riel | 711/163 |
| 2007/0061887 | A1 * | 3/2007 | Hoover et al. | 726/26 |
| 2007/0234077 | A1 * | 10/2007 | Rothman et al. | 713/300 |
| 2007/0243934 | A1 * | 10/2007 | Little et al. | 463/40 |
| 2008/0043732 | A1 * | 2/2008 | Desai et al. | 370/389 |
| 2008/0126603 | A1 * | 5/2008 | Hosoya | 710/22 |

OTHER PUBLICATIONS

Barham, et al., "Xen and the art of virtualization", Jan. 1, 2003, pp. 164-177.*
Allyn Romanow, Stephen Bailey, "An Overview of RDMA over IP", Internet Society 2002.*
Barham, et al., "Xen and the art of virtualization," pp. 164-177, Jan. 1, 2003.
Allyn Romanow, Stephen Bailey, "An Overview of RDMA over IP," Internet Society 2002.

* cited by examiner

*Primary Examiner* — Douglas Blair
*Assistant Examiner* — Oleg Survillo
(74) *Attorney, Agent, or Firm* — Schwabe, Williamson & Wyatt, P.C.

(57) ABSTRACT

The present disclosure relates to memory access, and specifically to memory access utilizing internet protocol (IP) addressing semantics. Various embodiments, methods, apparatus and systems are provided that allow a system to detect that a memory access has been attempted involving a region of memory that is mapped to a network device; and to perform the memory access utilizing, at least in part, the networked device and a network interface. Other embodiments may be described and claimed.

18 Claims, 2 Drawing Sheets

MEMORY MAPPED NETWORK ACCESS

BACKGROUND

1. Field

The present disclosure relates to a technique for memory access, and specifically to memory access utilizing internet protocol (IP) addressing semantics.

2. Background Information

Currently, the market is driving larger physical and virtual address space on commodity hardware as exemplified by the EM64T and AMD64 extensions to the x86 instruction set. Also, the High Performance Computing (HPC) community is increasingly moving towards clusters of commodity systems typically connected via a high-speed interconnect. Such interconnects may include Infiniband or Quadrics technology.

Typically, these clusters or distributed computing systems need to communicate with other systems within and without the cluster. Often various process within a program running on the cluster need to communicate or provide data to another process within the program. Such Inter-Process Communication (IPC) incurs a large overhead. Unfortunately, there is currently no widely used standard messaging mechanism for IPC in large systems, beyond massive SMP's that cost a large amount of money to maintain cache-coherence.

Often scientific HPC applications may be coded utilizing the Message Passing Interface (MPI) library in order to gain some degree of portability. However, there is invariably some layer of software that must bind to the particular interconnection transport. Therefore, it would be beneficial for HPC deployments to have a low-latency IPC mechanism. Preferably the mechanism would be highly portable and available via commodity hardware. It is understood that, while any such mechanism may be advantageous for HPC systems, such a mechanism may also be useful to peer-to-peer gaming and other emergent network use-models.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

Figure 1:
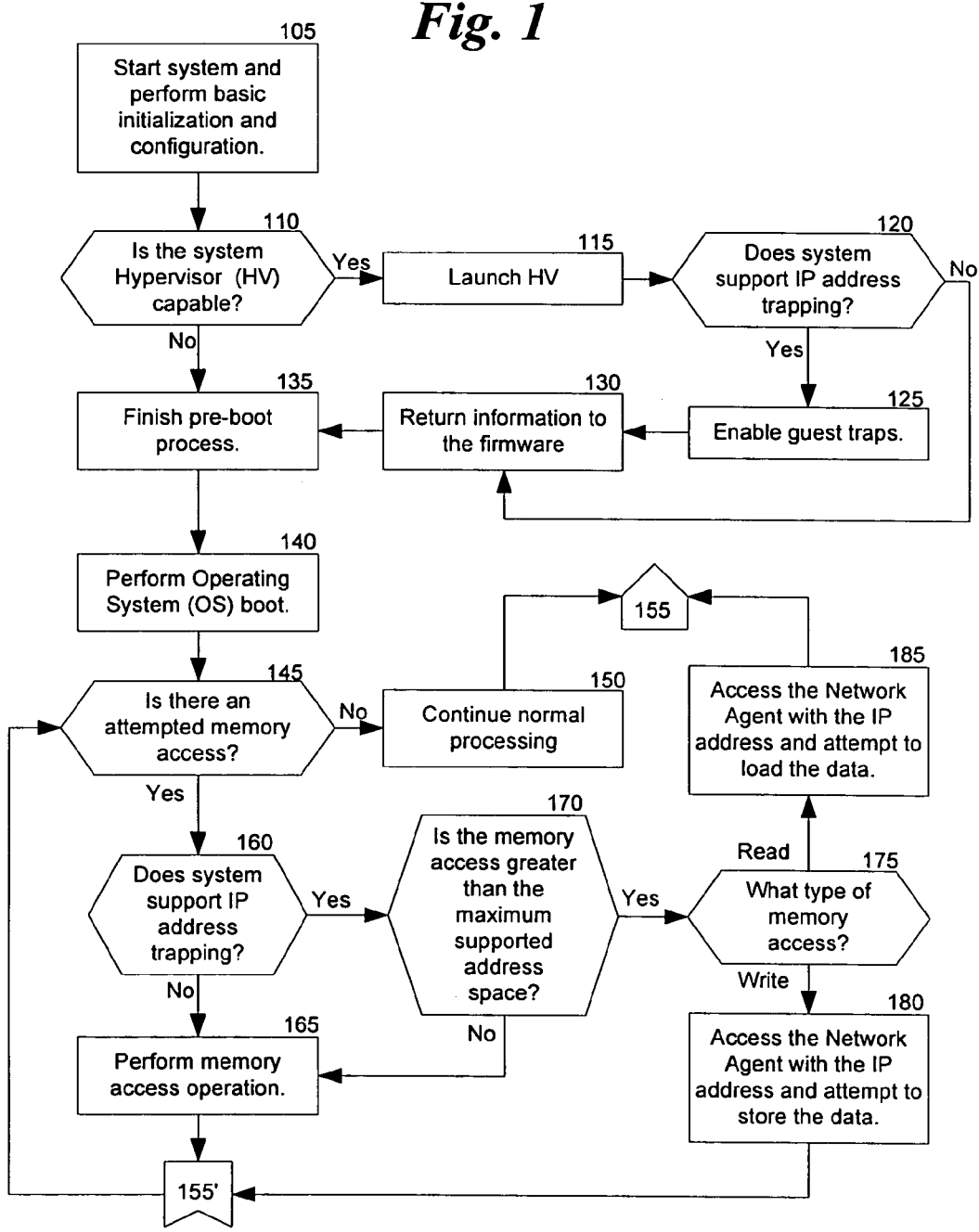
FIG. 1 is a flowchart illustrating an embodiment of a technique for memory access in accordance with the claimed subject matter.

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

In the following detailed description, reference is made to the accompanying drawings which form a part hereof, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element. And, so forth.

For ease of understanding, the description will be in large part presented in the context of commodity networking; however, the present invention is not so limited, and may be practiced to provide more relevant answers to a variety of queries. Reference in the specification to a network "device" and/or "appliance" means that a particular feature, structure, or characteristic, namely device operable connectivity, such as the ability for the device to be connected to communicate across the network, and/or programmability, such as the ability for the device to be configured to perform designated functions, is included in at least one embodiment of the digital device as used herein. Typically, digital devices may include general and/or special purpose computing devices, connected personal computers, network printers, network attached storage devices, voice over internet protocol devices, security cameras, baby cameras, media adapters, entertainment personal computers, and/or other networked devices suitably configured for practicing the present invention in accordance with at least one embodiment.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The virtualization of machine resources has been of significant interest for some time; however, with processors becoming more diverse and complex, such as processors that are deeply pipelined/super pipelined, hyper-threaded, on-chip multi-processing capable, and processors having Explicitly Parallel Instruction Computing (EPIC) architecture, and with larger instruction and data caches, virtualization of machine resources is becoming an even greater interest.

Many attempts have been made to make virtualization more efficient. For example, some vendors offer software products that have a virtual machine system that permits a machine to be virtualized, such that the underlying hardware resources of the machine appears as one or more independently operating virtual machines (VM). Typically, a Virtual Machine Monitor (VMM, also referred to as a "Hypervisor") may be a thin layer of software running on a computer responsible for creating, configuring, and managing VMs. It may also be responsible for providing isolation between the VMs. In one embodiment, the VMM may be an application running within a host operating system. In one specific embodiment, the VMM may include 3 main portions: a kernel mode application or set of applications running on the host operating system, a set of drivers in the host operating system, and a co-operative kernel that substantially or partially replaces the host kernel when the VM is running. In an alternate embodiment, the VMM may be a layer of basic code executing directly on the host hardware. Each VM, on the other hand, may function as a self-contained platform, running its own operating system (OS), or a copy of the OS, and/or a software application. Software executing within a VM is collectively referred to as "guest software" or "guest OS". Some commercial solutions that provide software VMs include VMware, Inc. (VMware) of Palo Alto, Calif. and VirtualPC by Microsoft Corp. of Redmond, Wash.

FIG. 1 is a flowchart illustrating an embodiment of a technique for memory access in accordance with the claimed subject matter. Block 105 illustrates that, in one embodiment, a system may be started and basic initialization and configuration may occur. It is understood that in some embodiments the system may be rebooted or otherwise reset to a certain point. Also, it is understood that in various embodiments, various forms of initialization and/or configuration may or may not occur, including no initialization or configuration.

Block 110 illustrates that, in one embodiment, a determination may be made whether or not a system or apparatus is capable of running a hypervisor (HV). In one embodiment, the determination may also include whether or not a hypervisor is present and capable of being run. In other embodiments the presence and ability to run a hypervisor or substantially equivalent technology may be assumed. In various embodiments, the determination my not involve a hypervisor, but instead the ability of a chipset or processor to support virtualization, such as, for example, the Intel Virtualization Technology (VT), Advanced MicroDevices Virtualization (AMD-V), or substantially equivalent technologies.

Block 115 illustrates that, in one embodiment, if a hypervisor is present that the hypervisor may be executed. Block 120 illustrates that, in one embodiment, a determination may be whether or not the system supports IP address trapping. In one embodiment, the support may be part of the systems hardware, firmware, software or a combination thereof. In one particular embodiment, the support may be a specific function of the hypervisor.

In one specific illustrative embodiment, the system may allow only $2^{44}$ addresses spaces in the physically mapped memory space. However, the hypervisor may support presenting the guest virtual machine with a virtual memory space that provides $2^{64}$ addresses. In one specific embodiment, the virtual addresses above the $2^{44}$ boundary may be mapped to a memory on a network device via an IP address. As illustrated in more detail below, when a guest virtual machine accesses a memory location in the mapped space, the hypervisor may trap the memory request and forward it to the network device.

In one specific illustrative embodiment, to which the disclosed subject matter is not limited, a cluster of systems or virtual machines may be presented with versions of this $2^{64}$ address space. The area above the $2^{44}$ boundary may be located on a network device and shared between the various systems in the cluster. Therefore, this memory space may be conveniently shared between the devices of the cluster, without explicitly initiating an inter-process communication request. Inter-process communication, in this embodiment, may simply occur via a standard memory access. Of course, in some embodiments, the IP memory space (illustrate din this embodiment as the memory space above the $2^{44}$ boundary) may be stored on a single or a plurality of devices. It is also envisioned that this memory may take various forms, such as, for example, standard RAM, a hard drive, a flash drive, etc. It is also understood that the disclosed subject matter is not limited to facilitating inter-process communication and that that is merely one illustrative embodiment of the disclosed subject matter.

In one embodiments, a protocol with a large number of network addresses may be used, such as for example Internet Protocol version 6 (IPv6). In which case, each IP memory space address may be associated with a particular network address. In other embodiments, the overall network address space may be more limited and the IP memory space may be a region or regions associated with an network address and offset information may be provided to properly identify the particular IP memory address accessed. In yet another embodiment, a combination of the two systems may be used. It is understood that which the term IP address and network address are frequently used interchangeably through this document, the utilization of the Internet Protocol is merely one embodiment of the disclosed subject matter and other networking protocols are within the scope of the disclosed subject matter.

Block 125 illustrates the case where IP address trapping is supported. In one embodiment, the hypervisor may allow trapping of guest requests to access memory locations in the IP memory address space. In one embodiment, this may include configuring the guest operating system or BIOS to facilitate this activity. In another embodiment, the hypervisor may be able to enable this feature without configuring the guest operating system.

Block 130 illustrates that the hypervisor may, in one embodiment, return information to the host system, specifically its firmware or, in other embodiments, other portions of the host system. Block 135 illustrates that the pre-boot process may be completed on the host system.

Block 145 illustrates that, in one embodiment, the operating system may be booted. In one embodiment, this may the operating system of the host system. In another embodiment the operating system may the guest operating system within a virtual machine. In one version of such an embodiment, the host operating system may effectively be the hypervisor. It is understood that, in one embodiment, various virtual machine operating machines may boot at any time during this process, and that parallel embodiments of the remaining illustrative blocks may exist and be operating at a given time.

Block 145 illustrates that, in one embodiment, a determination may be made whether or not a memory access has been attempted. Block 150 illustrates that, in one embodiment, if no memory access is currently being attempted normal processing may continue and the flowchart may return to Block 145 (illustrated via the path flowing through diagrammatic Blocks 155 and 155'). Therefore, in one embodiment, Block 145 may be thought of as a wait state until a memory access is attempted.

Block 160 illustrates that, in one embodiment, if a memory access is attempted a determination may be made whether or not the system supports IP address trapping. In one embodiment, the IP address space trapping may be supported by a hypervisor as discussed above. In another embodiment, the IP address space trapping may be supported utilizing other techniques, such as, for example, hardware support in the chipset, processor, or other device; firmware support; or support in the host operating system; however, these are merely a few illustrative embodiments to which the disclosed subject matter is not limited.

Block 165 illustrates that, in one embodiment, if IP address trapping is not supported or not needed the memory access may be performed. Once accomplished, in one embodiment, the technique illustrated by FIG. 1 may return to Block 145.

Block 170 illustrates that, in one embodiment, a determination may be made as to whether or not the memory access is within the IP address space. In one embodiment, Block 160 and Block 170 may be combined into a single step. In one embodiment, the determination may involve determining whether or not the memory access occurs for a memory address greater than the maximum supported physical address space. It his embodiment, all IP address space may be located above a particular memory space boundary. For example, in the specific illustrative embodiment described above all memory space above the $2^{44}$ memory address boundary was considered in the IP address space.

Block 175 illustrates that, in one embodiment, a determination may be made whether or not the memory access is a read operation or a write operation. Block 185 illustrates that, in one embodiment, if the attempted memory access is a read, the network agent or device responsible for or associated with the network address of the accessed memory space may be contacted and the desired data may be requested. In one embodiment, if the desired data is not returned in a timely fashion, the system may report a memory access error, or utilize a different failure mechanism. The flowchart may return to Block 145 (illustrated via the path flowing through diagrammatic Blocks 155 and 155').

Block 180 illustrates that, in one embodiment, if the attempted memory access is a write, the network agent or device responsible for or associated with the network address of the accessed memory space may be contacted and the desired data may be sent. In one embodiment, if the desired data is not successfully written in a timely fashion, the system may report a memory access error, or utilize a different failure mechanism. In one embodiment, the system may assume the data has been correctly stored. The flowchart may return to Block 145 (illustrated via the path flowing through diagrammatic Block 155').

Figure 2:
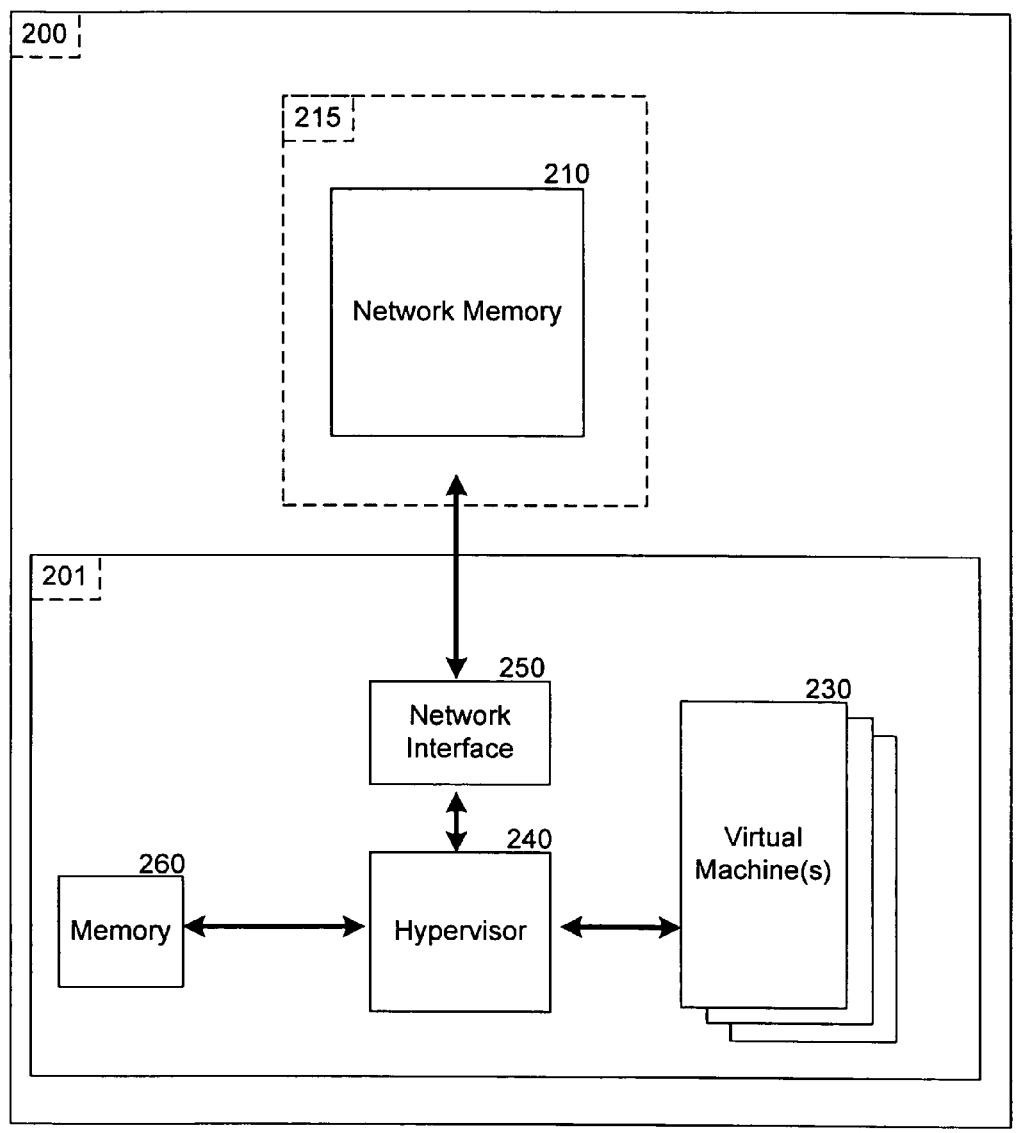
FIG. 2 is a block diagram illustrating an embodiment of a system and apparatus for memory access in accordance with the claimed subject matter.

FIG. 2 is a block diagram illustrating an embodiment of a system 200 and apparatus 201 for memory access in accordance with the claimed subject matter. In one embodiment, the system may include a network device 215 and the apparatus 201. In one embodiment, the network device may include network memory 210. It is envisioned that in various embodiments this network memory may take various forms, such as, for example, standard RAM, a hard drive, a flash drive, etc. In one embodiment, the network device may be capable of facilitating the mapping of a memory region to the network device.

In one embodiment, the apparatus 201 may include a memory 260, a network interface 250, a hypervisor 240, and one or more virtual machines 230. It is understood that in another embodiment the apparatus may include an operating system and applications. While these are not shown, the operating system would replace the hypervisor 240 and the applications would replace the virtual machines 230. In one embodiment, the hypervisor and associated virtual machines may act as an application in the operating system/application embodiment.

In one embodiment, the memory 260 may be capable of storing data and/or instructions. In one embodiment, the network interface 250 may be capable of facilitating communication with network device 215. In one embodiment, the hypervisor 240 (or, in another embodiment, the operating system) may be capable of executing at least portions of the technique described above and illustrated in FIG. 1. In one embodiment, the virtual machines 230 (or, in another embodiment, the applications) may be capable of attempting to access memory locations either within the memory 260 or the network memory 210.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The invention claimed is:

1. A method comprising:
   mapping, by a virtual machine monitor of a system, a plurality of virtual memory addresses within a region of a virtual memory address space of a virtual machine to a plurality of internet protocol (IP) addresses, wherein the plurality of virtual memory addresses being mapped correspond to physical memory locations beyond a range of physical memory addresses available on the system, and wherein the virtual machine is disposed on the system;
   trapping, by the virtual machine monitor, a memory read or write access made by a guest operating system;
   determining, by the virtual machine monitor, that the memory read or write access occurs for a memory address that is greater than the range of physical memory addresses available on the system, wherein the memory read or write access involves one of the plurality of virtual memory addresses within said region of the virtual memory address space that is mapped to one of the plurality of IP addresses; and
   transmitting, by the virtual machine monitor, a data read or write request corresponding to the memory read or write access to a network device associated with the one of the plurality of IP addresses corresponding to the one of the plurality of the virtual memory addresses.

2. The method of claim 1, wherein the memory access facilitates inter-process communication.

3. The method of claim 1, wherein the range of physical memory addresses available on the system includes $2^{44}$ addresses, and the range of virtual memory addresses provided to the guest operating system includes $2^{64}$ addresses.

4. The method of claim 1, wherein the IP addresses are Ipv6 addresses.

5. The method of claim 1, wherein mapping comprises mapping, by the virtual machine monitor, each of the plurality of virtual memory addresses within the region of the virtual memory address space of the virtual machine to a corresponding IP address of the plurality of internet protocol (IP) addresses on the one-to-one basis.

6. The method of claim 1, wherein mapping comprises mapping by the virtual machine monitor, multiple ones of the plurality of virtual memory addresses within the region of the virtual memory address space of the virtual machine to one of the plurality of internet protocol (IP) addresses, and wherein mapping further comprises associating multiple offsets to the mapped IP address for the multiple ones of the plurality of virtual memory addresses.

7. A method comprising:
mapping, by a hypervisor of a computing device, a plurality of virtual memory addresses within a region of a virtual memory address space of a virtual machine to a plurality of internet protocol (IP) addresses, wherein the virtual memory addresses being mapped correspond to physical memory locations beyond a range of physical memory addresses available on the computing device, and wherein the virtual machine is disposed on the computing device;
trapping, by the hypervisor, a memory read or write access by a guest operating system;
determining, by the hypervisor, whether the memory read or write access occurs for a memory address that is greater than the range of physical memory addresses available on the computing device, wherein the memory read or write access involves one of the plurality of virtual memory addresses mapped to one of the plurality of IP addresses;
upon determining that the memory read or write access occurs for the memory address that is greater that the range of physical memory addresses available on the computing device, forwarding, by the hypervisor, a data read or write request corresponding to the memory read or write access to a network device associated with the one of the plurality of IP addresses corresponding to the one of the plurality of virtual memory addresses; and
upon determining that the memory read or write access occurs for the memory address that is within the range of physical memory addresses available on the computing device, allowing the memory read or write access to proceed without said forwarding.

8. The method of claim 7, wherein the memory read or write access facilitates communication between the virtual machine and another virtual machine disposed on the computing device or another computing device.

9. The method of claim 8, wherein trapping the memory read or write access includes utilizing a hardware feature of the computing device running the hypervisor.

10. The method of claim 9, wherein the hardware feature of the computing device is a portion of Intel Virtualization Technology.

11. The method of claim 7, wherein the hypervisor keeps the guest operating system unaware of whether the memory read or write access is facilitated by the forwarding of the corresponding data read or write request.

12. An apparatus comprising:
a physical memory configured to store data;
a chipset configured to support a virtual machine monitor that is configured to:
map a plurality of virtual memory addresses within a region of a virtual memory address space of a virtual machine to a plurality of network addresses, wherein the plurality of virtual memory addresses being mapped correspond to physical memory locations beyond a range of physical memory addresses available on the physical memory of the apparatus, and wherein the virtual machine is disposed on the apparatus;
trap a memory read or write access made by a guest operating system;
determine that the memory read or write access occurs for a memory address that is greater than the range of physical memory addresses available on the physical memory of the apparatus, wherein the memory read or write access involves one of the plurality of virtual memory addresses within said region of the virtual memory address space that is mapped to one of the plurality of network addresses; and
forward a data read or write request corresponding to the memory read or write access to a network device associated with the one of the plurality of network addresses corresponding to the one of the plurality of the virtual memory addresses; and
a network interface coupled with the chipset and configured to enable the virtual machine monitor to forward the memory read or write request by transmitting the memory read or write request to the network device associated with the one of the plurality of network addresses, wherein the network device comprises a network memory configured to store data.

13. The apparatus of claim 12, wherein the virtual machine monitor is further configured to divide the virtual memory address space between the physical memory of the apparatus and the network memory of the network device.

14. The apparatus of claim 13, wherein the virtual machine monitor is further configured to allow a memory read or write access for a memory address that is within the range of physical memory addresses available on the physical memory of the apparatus to proceed without said transmitting the corresponding data read or write request to the network device.

15. The apparatus of claim 12, wherein the virtual machine monitor is a hypervisor.

16. The apparatus of claim 12, wherein the chipset is further configured to map each of the plurality of virtual memory addresses within the region of the virtual memory address space of the virtual machine to a corresponding network address of the plurality of network addresses on the one-to-one basis.

17. The apparatus of claim 12, wherein the chipset is further configured to map multiple ones of the plurality of virtual memory addresses within the region of the virtual memory address space of the virtual machine to one of the plurality of network addresses, and associate multiple offsets to the mapped network address for the multiple ones of the plurality of virtual memory addresses.

18. An article comprising:
a tangible non-transitory computer-readable storage medium having a plurality of machine accessible instructions, wherein the instructions, in response to execution of the instructions by a computing device, cause a virtual machine monitor of the computing device to:

map a plurality of virtual memory addresses within a region of a virtual memory address space of a virtual machine to a plurality of internet protocol (IP) addresses, wherein the virtual memory addresses being mapped correspond to physical memory locations beyond a range of physical memory addresses available on the computing device, and wherein the virtual machine is disposed on the computing device;

trap a memory read or write access made by a guest operating system;

determine that the memory read or write access occurs for a memory address that is greater than the range of physical memory addresses available on the computing device, wherein the memory read or write access involves one of the plurality of virtual memory addresses within the region of the virtual memory address space that is mapped to one of the plurality of IP addresses; and transmit a data read or write request corresponding to the memory read or write access to a network device associated with the one of the plurality of IP addresses corresponding to the one of the plurality of virtual memory addresses.

* * * * *